(12) United States Patent
Frick

(10) Patent No.: US 9,539,650 B2
(45) Date of Patent: Jan. 10, 2017

(54) SYSTEM FOR POSITIONING AND DRILLING IN CABINET, DRAWER AND SHELF HARDWARE

(71) Applicant: John Reid Frick, Quartz Hill, CA (US)

(72) Inventor: John Reid Frick, Quartz Hill, CA (US)

( * ) Notice: Subject to any disclaimer, the term of this patent is extended or adjusted under 35 U.S.C. 154(b) by 228 days.

(21) Appl. No.: 14/322,105

(22) Filed: Jul. 2, 2014

(65) Prior Publication Data

US 2015/0016907 A1    Jan. 15, 2015

Related U.S. Application Data

(60) Provisional application No. 61/843,795, filed on Jul. 8, 2013.

(51) Int. Cl.
*B23B 47/28* (2006.01)
*B25H 7/02* (2006.01)

(52) U.S. Cl.
CPC .............. *B23B 47/287* (2013.01); *B25H 7/02* (2013.01); *B23B 47/28* (2013.01); *Y10T 408/567* (2015.01)

(58) Field of Classification Search
CPC ......... B23B 47/287; B23B 47/28; B25H 7/02; Y10T 408/567
USPC ...................................................... 408/115 R
See application file for complete search history.

(56) References Cited

U.S. PATENT DOCUMENTS

| | | | | |
|---|---|---|---|---|
| 2,619,730 A | * | 12/1952 | Carter | ...................... B25H 7/00 33/666 |
| 2,864,268 A | * | 12/1958 | Anderson | ............... B23B 31/08 408/115 R |
| 5,507,607 A | * | 4/1996 | Ericksen | ............... B23B 47/287 408/108 |
| 5,807,036 A | * | 9/1998 | Lostlen | ................. B23B 47/287 408/115 R |
| 7,082,692 B2 | * | 8/2006 | Shapiro | .................... G01B 3/04 33/464 |
| 2011/0167604 A1 | | 7/2011 | Stewart et al. | |
| 2012/0217689 A1 | | 8/2012 | Sambuceto et al. | |

* cited by examiner

*Primary Examiner* — Eric A Gates
*Assistant Examiner* — Paul M Janeski
(74) *Attorney, Agent, or Firm* — Kelly & Kelley, LLP

(57) ABSTRACT

A system for positioning and drilling in cabinet, drawer, and shelf hardware components generally having a self-centering ruler and a jig template. The ruler has a zero mid-point and graduated measurement markings extending to each side of the zero mid-point toward opposite ends. A channel is disposed along a length of the ruler and has a generally T-shaped cross-section and is configured to slidingly receive a head of the securing bolt. The jig template has an adjustment slot configured to receive a stem of the securing bolt extending from an opening of the channel. A tightening knob securingly engages the stem of the securing bolt so as to secure the jig template between the tightening knob and the self-centering ruler.

12 Claims, 14 Drawing Sheets

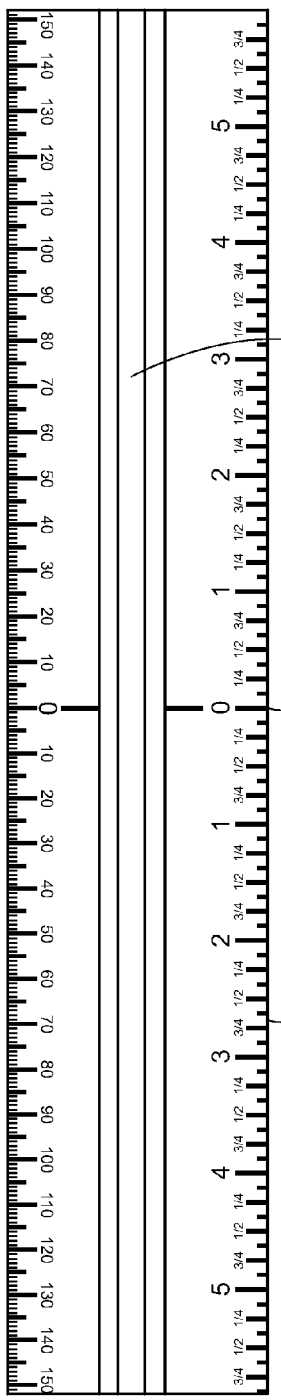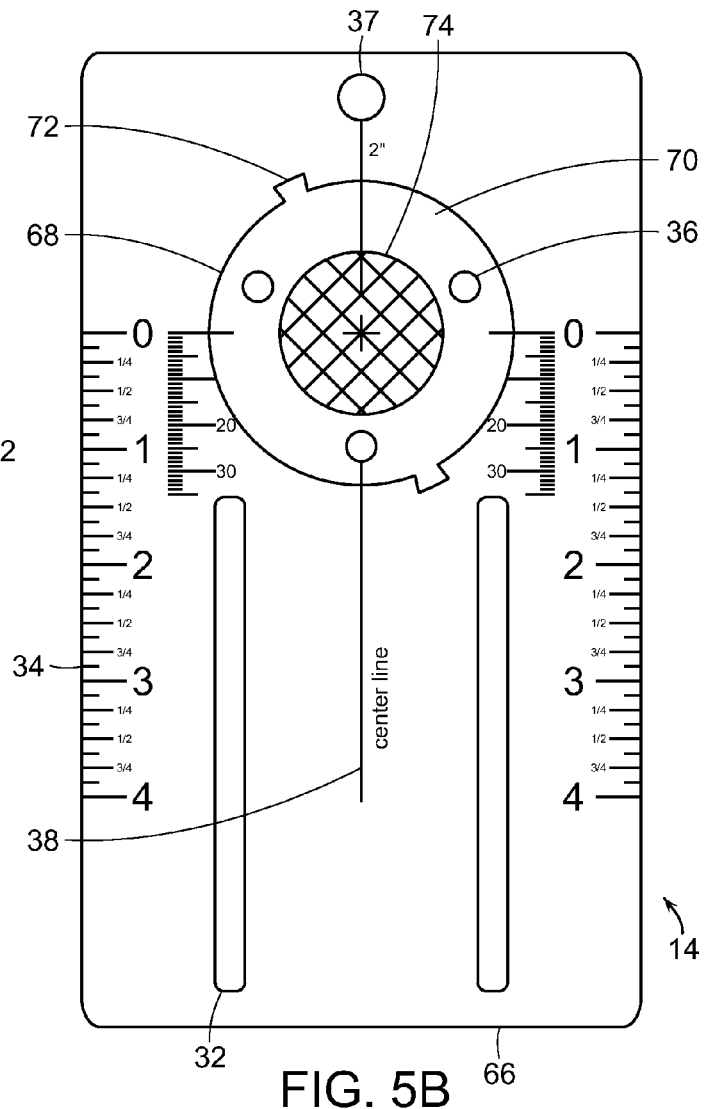
FIG. 5A
FIG. 5B

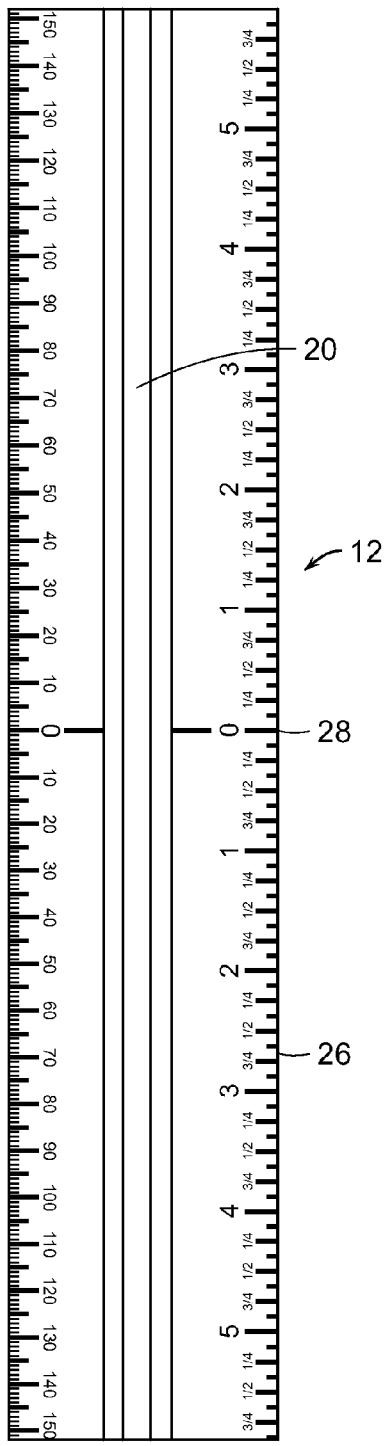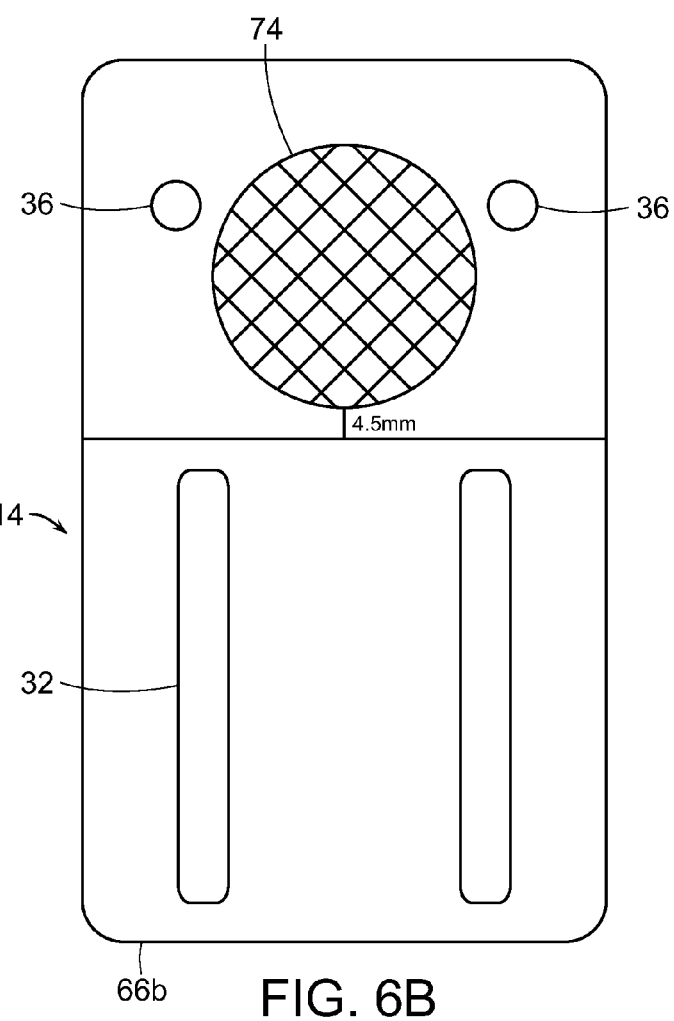
FIG. 6A
FIG. 6B

SYSTEM FOR POSITIONING AND DRILLING IN CABINET, DRAWER AND SHELF HARDWARE

RELATED APPLICATION

This application claims the benefit of U.S. Provisional Application No. 61/843,795, filed on Jul. 8, 2013.

BACKGROUND OF THE INVENTION

The present invention relates generally to a system for easily and precisely positioning hardware in cabinets, drawers, bookcases and similar work pieces. More particularly, the system is for positioning and drilling holes or cups in components, such as, drawers and doors for handles and knobs, doors for hinges, side panels for drawer guides, hinges, clips or dowels, and adjustable shelves.

Presently, there are various tools, templates, guides and jigs on the market to locate and drill holes in cabinet drawers, doors and side panels, as well as various tools, templates, guides and jigs to locate and drill holes in other work pieces. Some of these tools, templates, guides, and jigs are adjustable or fixed and/or have limited use and some require the use of a separate measuring tape or ruler either prior to or during use to set the hole pattern. In addition, these existing tools require pre-measurement or alternate measurement means to center the tool on the current work piece. Furthermore, the current tools have a fixed construction that does not permit sufficient flexibility with work pieces of different configurations.

Thus, there is a need for a more versatile system of tools and/or jigs for positioning and drilling, which is easy to use, capable of carrying out multiple drilling tasks and compatible with various shapes and configurations of work pieces. The present invention fulfills these needs and provides other related advantages.

SUMMARY OF THE INVENTION

The present invention is directed to a system for positioning and drilling in cabinet, drawer, and shelf hardware components. The system generally comprises a self-centering ruler having a zero mid-point and graduated measurement markings extending to each side of the zero mid-point toward opposite ends of the self-centering ruler. A channel is disposed along a length of the self-centering ruler. The channel has a generally T-shaped cross-section and is configured so as to slidingly receive a head of a securing bolt. When the head of the securing bolt is received in the channel, a stem of the securing bolt extends out of an opening in the channel, which is on the same side or face of the ruler as the measurement markings. The system also includes a jig template having an adjustment slot configured to receive the stem of the securing bolt extending from the opening of the channel. A tightening knob is configured to securingly engage the stem of the securing bolt so as to secure the jig template between the tightening knob and the self-centering ruler.

The system preferably comprises two securing bolts, two adjustment slots and two tightening knobs. The heads of the two securing bolts are both slidingly received in the channel such that the stems of the two securing bolts both extend out of the opening. Each of the two adjustment slots are configured to separately receive one of the stems of the two securing bolts and the two tightening knobs are configured to securingly engage the stems of the two securing bolts.

The jig template may further comprise at least one drill hole disposed a pre-set distance from an end of the adjustment slot. The jig template may also have a set of measurement depth markings disposed with a zero point aligned with a center of the drill hole and generally extending from the drill hole in parallel with the adjustment slot. More preferably, the jig template comprises a plurality of drill holes, each disposed with their centers aligned with the zero point of the measurement depth markings and spread out generally on a zero-line perpendicular to the adjustment slot. The jig template may further comprise a side extension generally along the zero line and including one or more of the plurality of drill holes.

In an alternative embodiment, the jig template may comprise a center line generally extending along a center of the jig template and parallel with the adjustment slot. In this embodiment, the drill hole comprises a cup drill hole and a removable cup insert both centered on the center line. The cup insert has a central hole plug, secondary drill holes spaced around the central hole plug, and notches configured to align the cup insert with the cup drill hole.

In another alternative embodiment, the jig template may comprise a center line generally extending along a center of the jig template and parallel with the adjustment slot. The jig template also has a plurality of drill holes, each disposed with their centers along the center line. The jig template may further comprise an inset line disposed perpendicular to the center line and a second pre-set distance from the drill hole or plurality of drill holes.

In yet another alternative embodiment, the jig template may comprise a set of measurement depth markings disposed with a zero point aligned with an edge of the jig template and generally extending from the edge in parallel with the adjustment slot. The jig template has a center line generally extending along a center of the jig template and parallel with the adjustment slot. The jig template may also have an offset cutout configured to provide spacing for a top or bottom of a drawer box relative to a side panel of the drawer box.

The system may further comprise an adjustable stop having an edge guide configured to abut against a side of the self-centering ruler. The adjustable stop also has a bolt hole configured to receive a stem of a stop bolt disposed in the channel. The stop bolt is engaged by a stop knob so as to secure the adjustable stop between the stop knob and the self-centering ruler.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 5A illustrates an embodiment of a slotted ruler for use with the drawer front adjuster and hinge drilling jig of FIG. 5B;

FIG. 5B illustrates an embodiment of a drawer front adjuster and hinge drilling jig for use with the system of the present invention;

FIG. 6A illustrates an embodiment of a slotted ruler for use with the hinge cup screw locating jig of FIG. 6B;

FIG. 6B illustrates an embodiment of a hinge cup screw locating jig for use with the system of the present invention;

DETAILED DESCRIPTION OF THE PREFERRED EMBODIMENTS

Figure 1A:
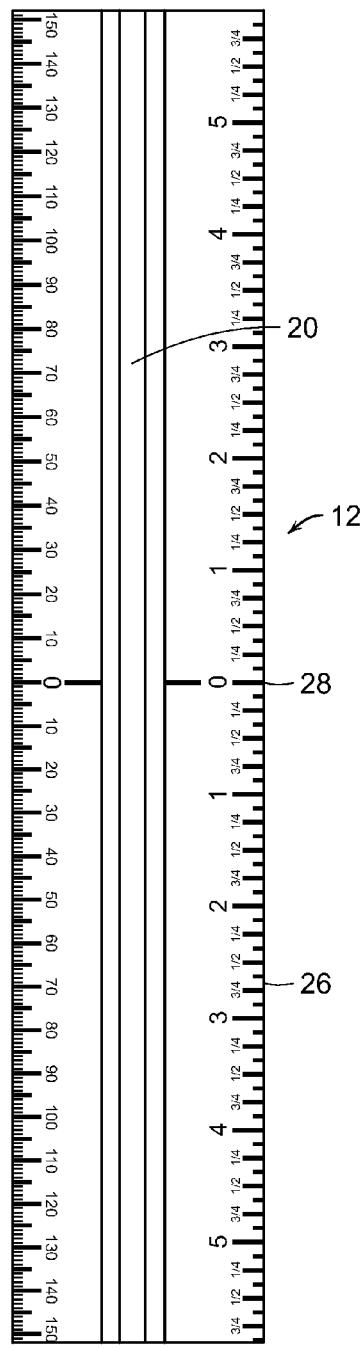
FIG. 1A illustrates an embodiment of a slotted ruler for use with the door handle jig of FIG. 1B.
Figure 1B:
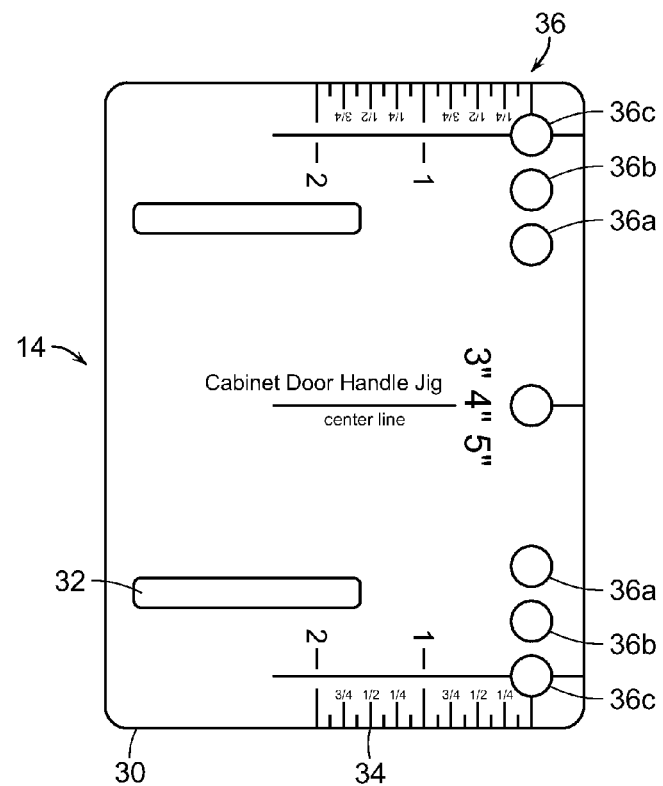
FIG. 1B illustrates an embodiment of a door handle jig for use with the system of the present invention.

The present invention is directed to a system for positioning and drilling holes and other features in cabinet components. Specifically, the system 10 comprises a slotted ruler, generally referred to by reference numeral 12, and a jig, generally referred to by reference numeral 14. The system 10 also includes bolts 16 and tightening knobs 18 for securing the jig 14 to the slotted ruler 12.

Figure 1C:
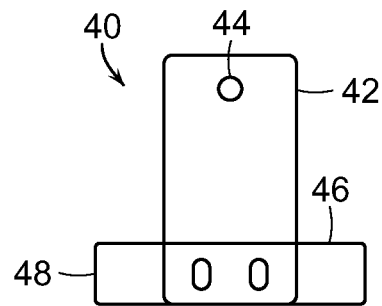
FIG. 1C illustrates an embodiment of an adjustable stop for use with the system of the present invention.
Figure 1D:
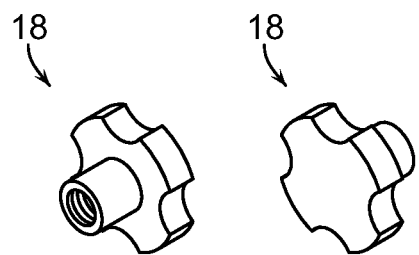
FIG. 1D illustrates an embodiment of a tightening knob for use with the system of the present invention.
Figure 1E:
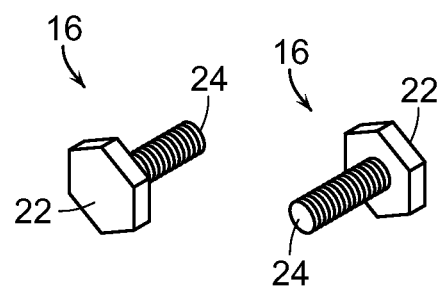
FIG. 1E illustrates an embodiment of a bolt for use with the system of the present invention.
Figure 2A:
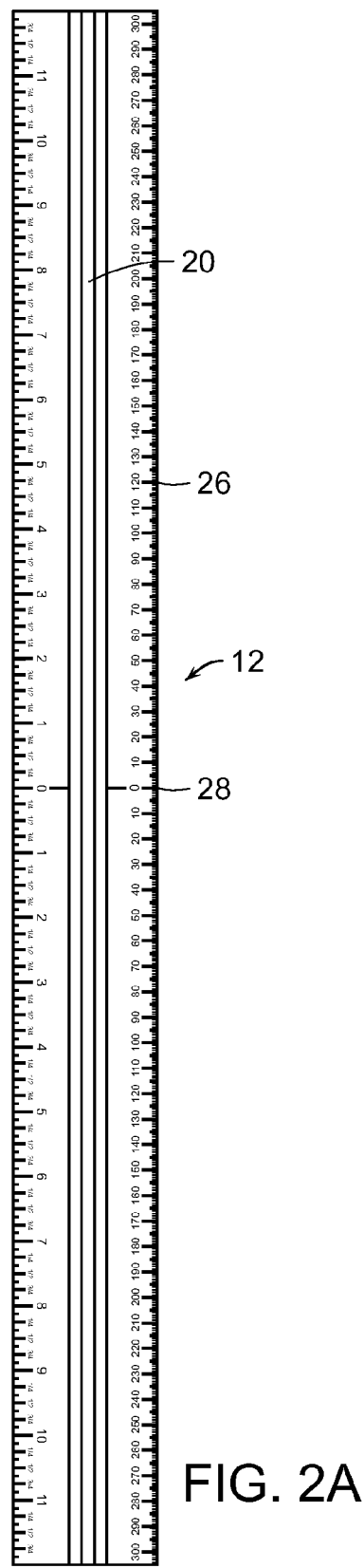
FIG. 2A illustrates an embodiment of a slotted ruler for use with the handle and knob drilling jig of FIG. 2B or 2C.
Figure 2B:
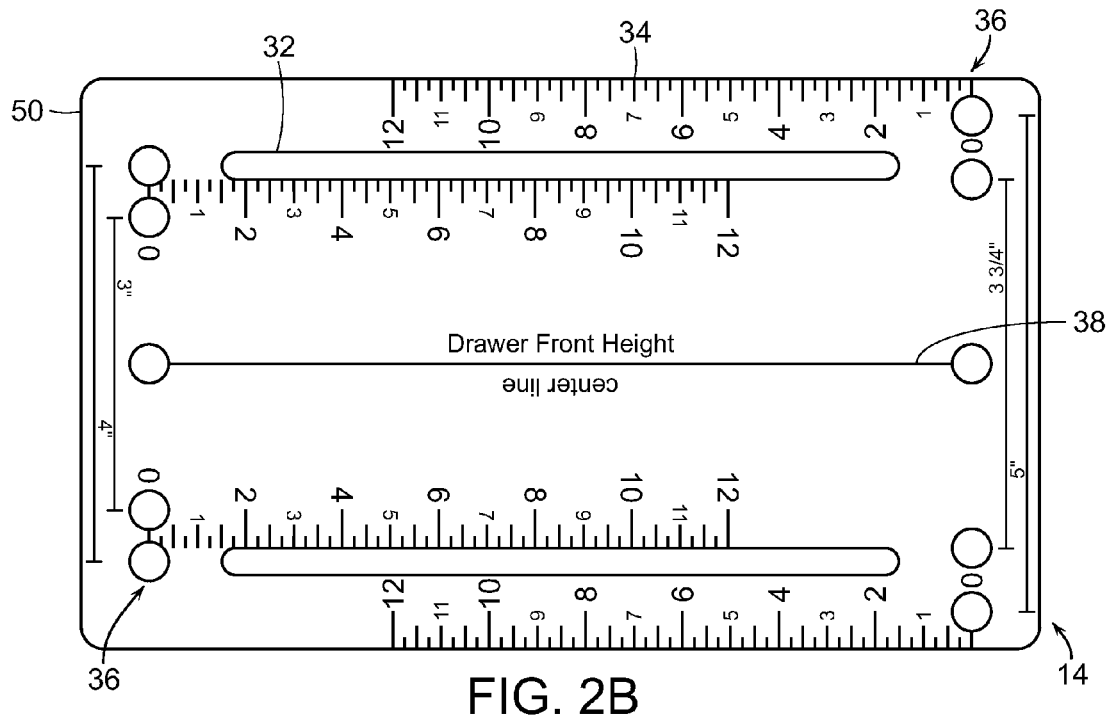
FIG. 2B illustrates an embodiment of a handle and knob drilling jig for use with the system of the present invention.
Figure 2C:
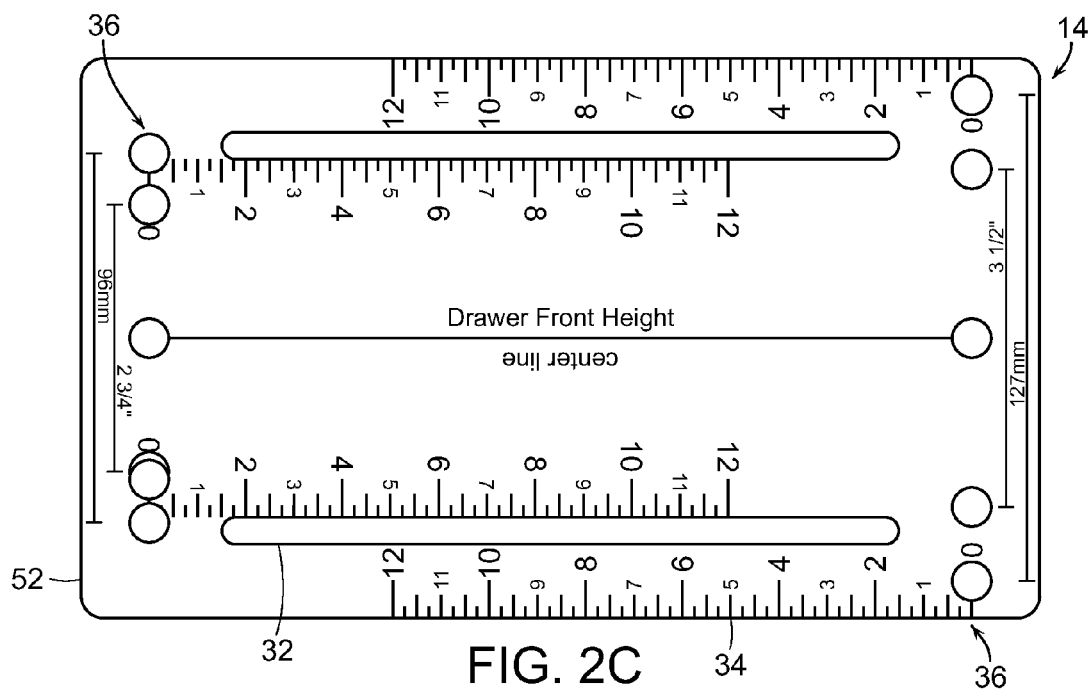
FIG. 2C illustrates an alternate embodiment of a handle and knob drilling jig for use with the system of the present invention.

Various embodiments of the system 10 generally comprise each of these components. The variations between each of the embodiments may comprise slotted rulers 12 of different sizes or forms and jigs 14 of different configurations, as shown in various embodiments illustrated in FIGS. 1A, 1B, and 2A through 9B. Similarly numbered figures, i.e., FIGS. 2A, 2B, and 2C, illustrate components of one particular embodiment of a kit or system 10. The various embodiments may also include additional components, i.e., stops (FIG. 1C), knobs (FIG. 1D), and bolts (FIG. 1E), as described herein.

Throughout the various embodiments, the slotted ruler 12 is generally self-centering and has an open channel 20 that has a generally T-shaped cross-section or a similar configuration. The channel 20 is configured to slidingly receive the head 22 of each of the bolts 16 in an open end of the channel 20, so as to be slideable the full length of the ruler 12. The stems 24 of the bolts 16 are configured to protrude upwardly through the opening of the channel 20 when inserted into the ruler 12.

The ruler 12 is self-centering insofar as graduated measurement markings 26 are configured with a zero starting point 28 in the center or mid-point of the length of the ruler 12. The measurement markings 26 increase in uniform values to each side of the zero starting point 28 to the ends of the ruler 12. In the illustrated embodiments, the ruler 12 is depicted as either twelve inches or twenty-four inches, but may be provided in other lengths as different woodworking projects may require. The measurement markings 26 may include fractional markings and have multiple units on opposite edges of the ruler 12.

FIGS. 1A, 1B, 1C, 1D, and 1E illustrate a particular embodiment of the system 10 comprising a cabinet door handle jig 30. The cabinet door handle jig 30 comprises a pair of adjustment slots 32. The adjustment slots 32 are configured to accept the stems 24 of the bolts 16 and be retained by application of the tightening knobs 18 to the bolts 16. With the bolt heads 22 in the slot 20, the tightening knobs 18 hold the jig 30 flush against the top surface of the ruler 12.

The adjustment slots 32 are elongated such that the jig 30 is slideable across the ruler 12. The jig 30 includes depth measurement markings 34 along the sides such that zero measurement is aligned with the center of a plurality of drill holes 36 disposed along a distal edge of the jig 30. The depth measurement markings 34 establish a distance between the drill holes 36 and the edge of the ruler 12. The jig 30 also includes a center line 38 for proper alignment with the zero starting point 28 on the ruler 12 or other starting point.

To use the cabinet door handle jig 30 of the embodiment of FIGS. 1A-1E, one needs to attach the jig 30 to the ruler 12 using the adjustment slots 32 with bolts 16 and tightening knobs 18 as described above. The desired depth of the handle from the edge of the door must be established using the depth measurement markings 34 aligned with the edge of the ruler 12. When the edge of the ruler 12 is placed against an edge of a door, the spacing of the depth measurement markings 34 will position the drill holes 36 at the desired distance from the edge of the door.

For example, if the desired spacing of the handle from the edge of the door is one and one-half inches, the one and one-half inch point on the depth measurement markings 34 is aligned with the edge of the ruler 12. Since the edge of the ruler 12 is abutting against the edge of the door, the drill holes 36 will be one and one-half inches from the edge of the door as well.

Depending upon the type of handle to attach to the door, one would use different combinations of drill holes 36. If the handle is a knob with a single screw, one would use the drill hole 36 on the center line 38. If the handle is an elongated handle having two points of attachment, one would use the matched pairs of drill holes 36a, 36b, 36c. For a three-inch handle, one would use the innermost pair of drill holes 36a. For a four-inch handle, one would use the middle pair of drill holes 36b. For a five-inch handle, one would use the outer pair of drill holes 36c. The pairs of drill holes 36a, 36b, 36c are equally spaced around the center line 38 such that the handle will be automatically centered around a desired point. Alternate spacing of the drill holes 36 can be provided to accommodate different sizes and styles of handles.

The ruler 12 can be used in a number of manners when coupled with a jig 14. With the self-centering feature of the ruler 12, if one wanted to center a handle on a six-inch cabinet door, one would place the edge of the ruler 12 against a side of the door. One would then align the three-inch markings with the top and bottom edges of the door which would automatically place the zero starting point 28 on the center line of the six-inch door. The self-centering feature works just as easily even if one does not know the exact measurement of the door. All one needs to do is align the top and bottom edges of the door with the same measurement marking 26 on each side of the zero starting point 28. Thus, if the top and bottom edges of the door are both on the three and one-half inch markings on each side of the zero starting point 28, then the zero starting point 28 is automatically disposed on the center line of the door, which in this case would be seven inches. Similar functionality exists with measurement markings 26 in other units such as metric.

In the case of doors larger than twelve inches, one may use a ruler 12 that is longer by design. In contrast, one may simply measure a known distance from the top or bottom edge of the door and align the center line 38 of the jig 30 with such measurement. Such would place the center line of the handle that desired distance from the top or bottom edge of the door. In addition, the jig 30 may be slid along the slot 20 such that it is aligned with another point besides the zero starting point 28. A person skilled in the art of woodworking will appreciate the variations in measurements that are possible.

The embodiment of FIGS. 1A-1E including the cabinet door handle jig 30 may also include an adjustable stop 40 that can be used to fixedly align the system 10 with the side and top/bottom edge of a door. The adjustable stop 40 is secured to the slot 20 by a separate bolt 16 and tightening knob 18. An edge of the adjustable stop 40 is aligned with a desired measurement marking 26 to fix the distance of the zero starting point 28 from a top or bottom edge of the door. This adjustable stop creates a right angle with the edge of the ruler 12 to facilitate squaring of the system 10 to the door. The adjustable stop 40 comprises a face plate 42 including a bolt hole 44 for accepting the bolt 16 and securing the same to the slot 20 on the ruler 12. The bolt hole 44 is a fixed distance from an edge guide 46 equal to the distance between the slot 20 and the edge of the ruler 12. In this way the edge guide 46 abuts against the side of the ruler 12. When positioned properly, an end 48 of the edge guide 46 is aligned with a measurement marking 26 as described above. This end of the edge guide 46 then abuts against the top or bottom edge of the door while the side of the ruler abuts a side edge of the door.

FIGS. 2A-2C illustrate an alternate embodiment of the system 10 comprising a pair of handle and knob drilling jigs 50 and 52. In this embodiment, the ruler 12 is illustrated as twenty-four inches in length to accommodate larger drawer fronts and cabinet doors and functions as described above. This system includes bolts 16 (FIG. 1C), tightening knobs 18 (FIG. 1D) and an adjustable stop 40 (FIG. 1E) which all function as described above. The jigs 50, 52 are both configured differently from the jig 30 described above. Each of the jigs 50, 52 includes a pair of adjustment slots 32 that are disposed at a midpoint of the jigs 50, 52. The jigs 50, 52 also include depth measurement markings 34 along their sides as described above. Drill holes 36 are disposed at opposite ends of the jigs 50, 52 and pairs of drill holes 36a, 36b are spaced about a center line 38.

The depth measurement markings 34 begin with their zero point in line from each of the sets of drill holes 36 and run along the adjustment slots 32. There may be as many as four sets of depth measurement markings 34 on each jig 50, 52 to accommodate each adjustment slot 32 and each set of drill holes 36. In addition, these depth measurement markings 34 are configured at a ratio of one-half their actual distance to facilitate centering of the handle or knob. Thus, if the drawer front were ten inches in width and one wanted a knob placed in the center of that width, one would align the ten-inch depth measurement marking 34 with the edge of the ten-inch wide drawer front. Such would place the drill hole 36 five inches from the edge of the drawer. By placing the measurement markings at a one-half ratio to the actual distance, it is not necessary for one to divide the width of the drawer front to determine the center point. One need only measure the full width of the drawer front and the markings 34 on the jigs 50, 52 would automatically determine the half distance measurement. Such is particularly useful when dealing with drawer front measurements of other than whole number values as it eliminates the need to deal with fractions. Similar functionality exists when centering a handle top to bottom and having a known height of the drawer front.

The drill holes 36 are provided in multiple pairs with different standard measurements, examples include two and three-quarters inches, three inches, three and one-half inches, three and three-quarter inches, four inches, and five inches. Drill hole pairs may also be provided in metric units, for example ninety-six millimeters and one hundred twenty-seven millimeters. One skilled in the art will appreciate that different measurements for the width of drill hole pairs 36a, 36b can be accommodated on various versions of the jigs 50, 52.

Figure 3A:
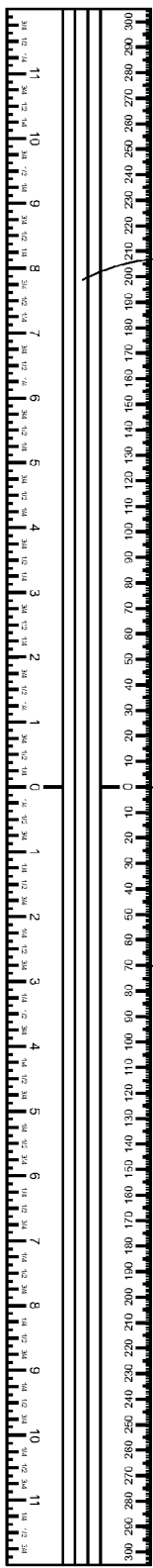
FIG. 3A illustrates an embodiment of a slotted ruler for use with the cabinet handle extension jig of FIG. 3B.
Figure 3B:
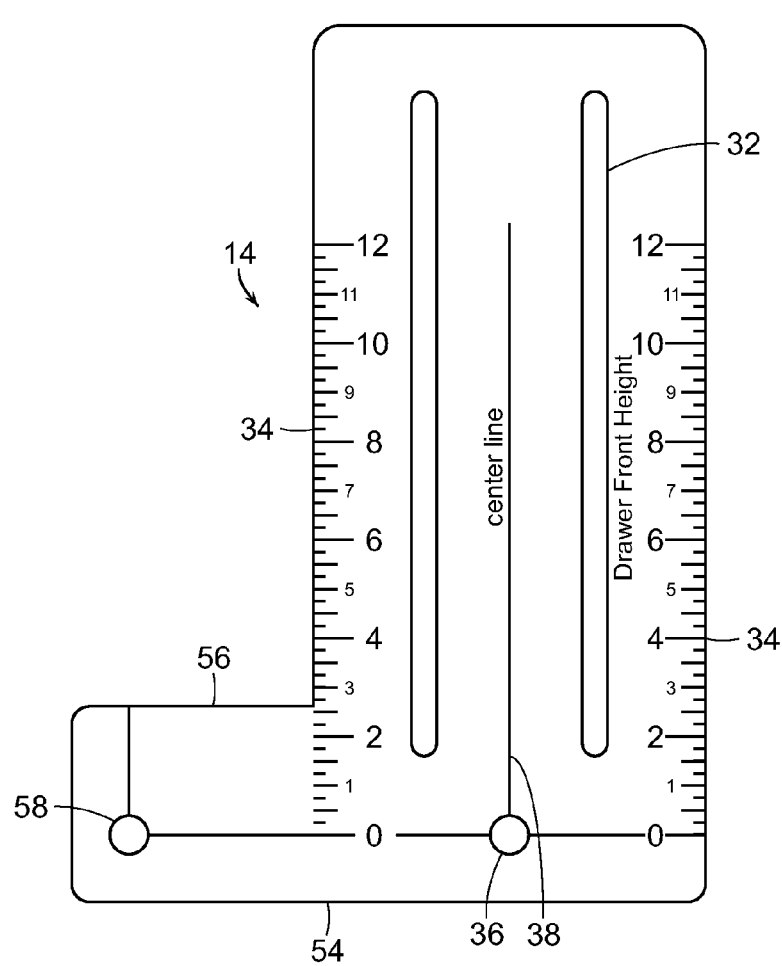
FIG. 3B illustrates an embodiment of a cabinet handle extension jig for use with the system of the present invention.

FIGS. 3A-3B illustrate another alternate embodiment of the system 10 comprising a cabinet handle extension jig 54. The cabinet handle extension jig 54 is configured similar to the jigs 50, 52 described above. However, this extension jig 54 includes a side extension 56 such that the drill holes 36 may extend farther beyond the edge of the jig 54. In this case, a particular drill hole 58 is disposed on the side extension 56. This drill hole 58 is disposed an additional hundred millimeters from a side edge of the jig 54. In the case of extra long drawers or cabinet doors, this side extension 56 and drill hole 58 can be used to position drill holes for such extra-long handles. The ruler 12, bolt 16 and tightening knobs 18 function as described above.

Figure 4A:
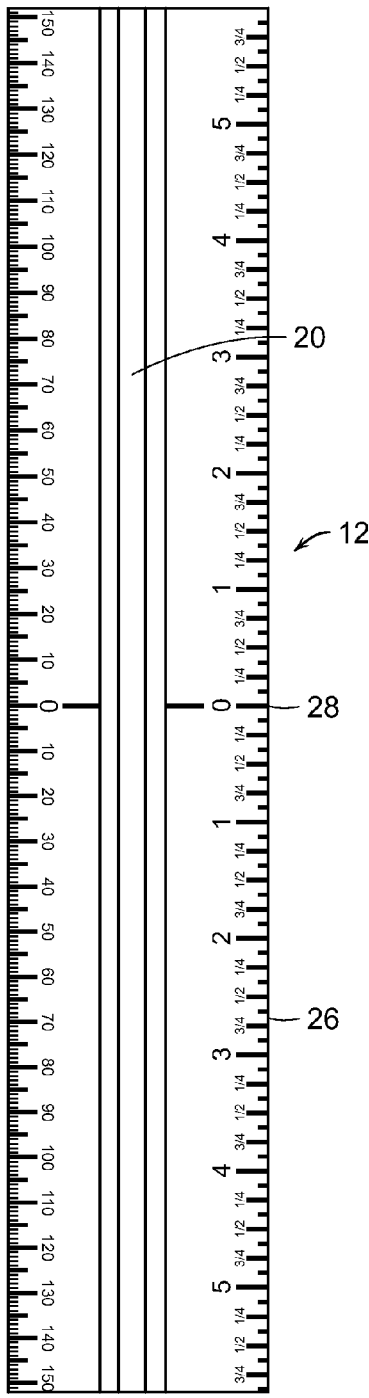
FIG. 4A illustrates an embodiment of a slotted ruler for use with the base plate drilling jig of FIG. 4B.
Figure 4B:
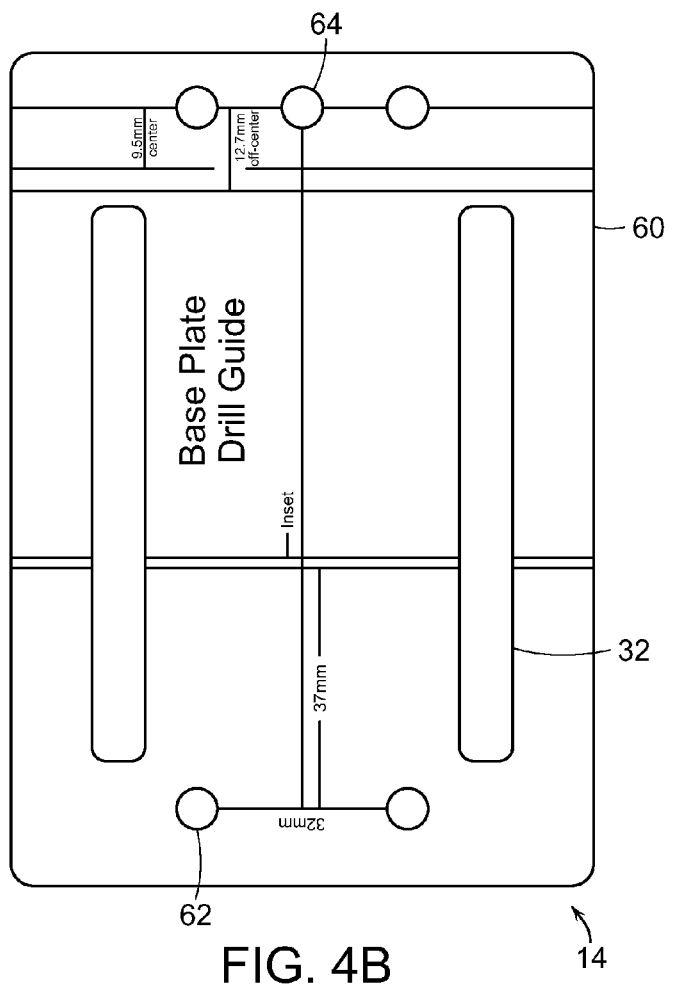
FIG. 4B illustrates an embodiment of a base plate drilling jig for use with the system of the present invention.

FIGS. 4A-4B illustrate another alternate embodiment of the system 10 comprising a base plate drill jig 60. The base plate drill jig 60 comprises a pair of adjustment slots 32 as described above. Drill holes 36 are disposed on opposite edges of the base plate jig 60 along a center line 38. One set of drill holes 36 is configured for a frameless cabinet and the other set of drill holes 36 on the opposite edge of the jig 60 are configured for a cabinet having a face frame. The frameless drill holes 62 are a preset distance apart corresponding to the default distance for a hinge base plate. The face frame drill holes 64 are also spaced a predetermined distance apart to accommodate standard hinge base plates. The face frame drill holes 64 also include off-center and center lines to space the drill holes from the edge depending upon the type of base plate used on the cabinet. The ruler 12, bolts 16 and tightening knobs 18 all function as described above.

FIGS. 5A-5B illustrate another alternate embodiment of the system 10 comprising a drawer front adjuster and hinge drilling jig 66. The drawer front and hinge drilling jig 66 has adjustment slots 32 as described above. The adjustment slots 32, ruler 12, bolts 16 and tightening knobs 18 all function as described above. The jig 62 includes a cup drill hole 68 that is sufficiently sized to accommodate a properly configured hole saw to drill a cup to work with certain designed hinges requiring a cup in the wood. Depth measurement markings 34 are disposed along the sides of the jig 66. These depth measurement markings 34 function to locate the center of the cup from the edge of the drawer front.

The jig 66 includes a removable cup insert 70 that is designed to snuggly fit in the cup drill hole 68. The cup drill hole 68 and cup insert 70 include dovetail notches 72 that are configured to ensure a snug fit and proper alignment of the insert 70 in the hole 68. The dovetail notches 72 are preferably canted from a center line 38 so as to require proper placement and alignment of the insert 70 in the hole 68. The cup insert 70 preferably includes drill holes 36 configured to align with standard drill holes on a hinge plate having a cup. The cup insert 70 may also include a plug 74 configured to fit in a previously drilled cup hole to further assure proper alignment when drilling the screw holes. An additional drill hole 37 is included to accommodate certain styles of hinge plates.

FIGS. 6A-6B illustrate another alternate embodiment of the system 10. This embodiment includes a hinge cup screw locating jig 66b that effectively operates in a manner similar to the jig 66 including insert 70 described in FIG. 5 above. The screw locating jig 66b includes a plug 74 configured to fit within a preexisting or predrilled cup hole as described above. This screw locating jig 66b cannot be used for drilling the cup hole. The jig 66 and screw locating jig 66b may be used together, eliminating the need for the cup insert 70. The screw locating jig 66b may also be used on cabinets that already have a cup hole drilled in the wood. This embodiment of FIG. 6 also includes a ruler 12, bolts 16 and tightening knobs 18, which all function as described above.

Figure 7A:
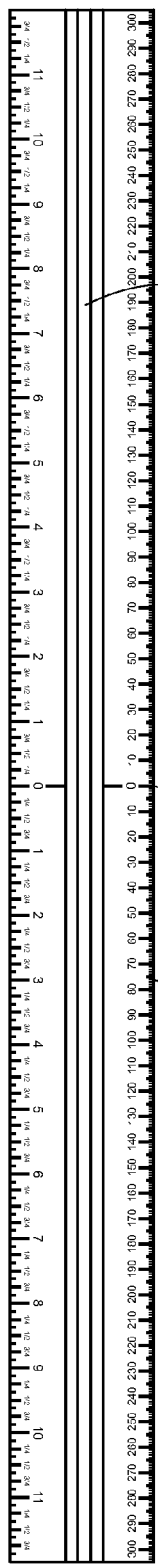
FIG. 7A illustrates an embodiment of a slotted ruler for use with the drawer slide jig of FIG. 7B or 7C.
Figure 7B:
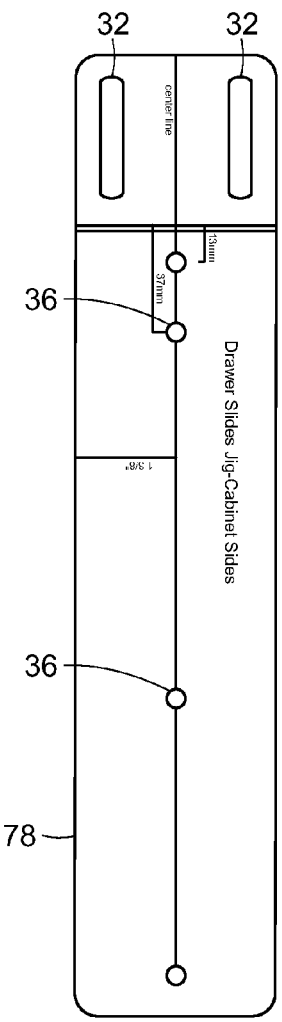
FIG. 7B illustrates an embodiment of a drawer slide cabinet jig for use with the system of the present invention.
Figure 7C:
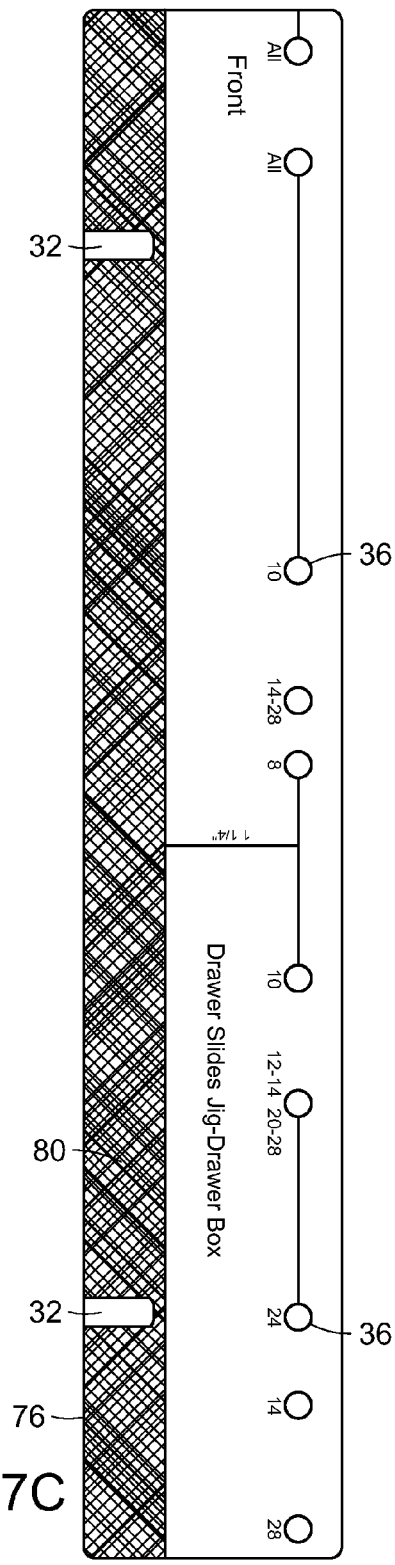
FIG. 7C illustrates an embodiment of a drawer slide box jig for use with the system of the present invention.

FIGS. 7A-7C illustrate another alternate embodiment of the system including slide jigs 76 and 78. The box slide jig 76 is designed for use on the side of a drawer box. The cabinet slide jig 78 is designed for use on the side of a cabinet that contains the drawer box. Both jigs 76, 78 include adjustment slots 32 which are configured to be used with the ruler 12, bolts 16, and tightening knobs 18 as described above. The cabinet slide jig 78 includes a center line 38. With proper alignment of the ruler 12 and placement of the bolts 16, the jigs 76, 78 can be used to confirm proper placement of the screw holes for standard size drawer slides. Each of the jigs 76, 78 include drill holes 36 that have proper spacing and alignment for multiple standard size drawer slides depending upon the overall length of the slide and the drawer. The system 10 employing jigs 76, 78 preferably uses a twenty-four inch ruler 12 to accommodate the length of typical drawers. The box slide jig 76 includes a spacing gap 80 and has the drill holes 36 offset from the spacing gap 80. The offset between the drill holes 36 and spacing gap 80 is preferably a standard spacing, typically about one and one-quarters of an inch, used with drawer slides.

Figure 8A:
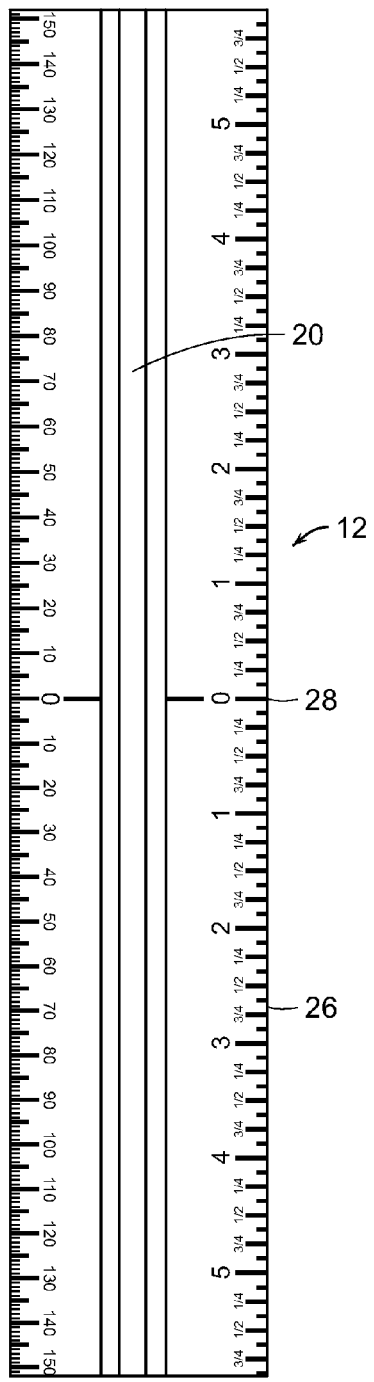
FIG. 8A illustrates an embodiment of a slotted ruler for use with the drawer box back drilling jig of FIG. 8B.
Figure 8B:
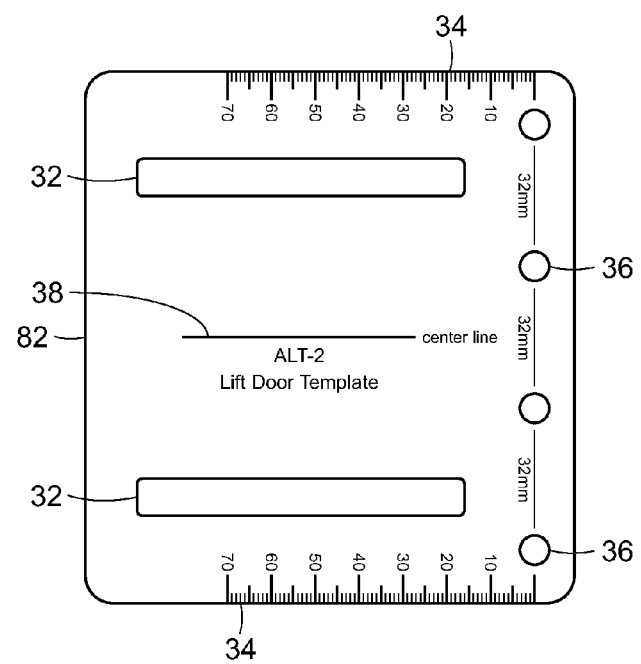
FIG. 8B illustrates an embodiment of a lift door template jig for use with the system of the present invention.
Figure 8C:
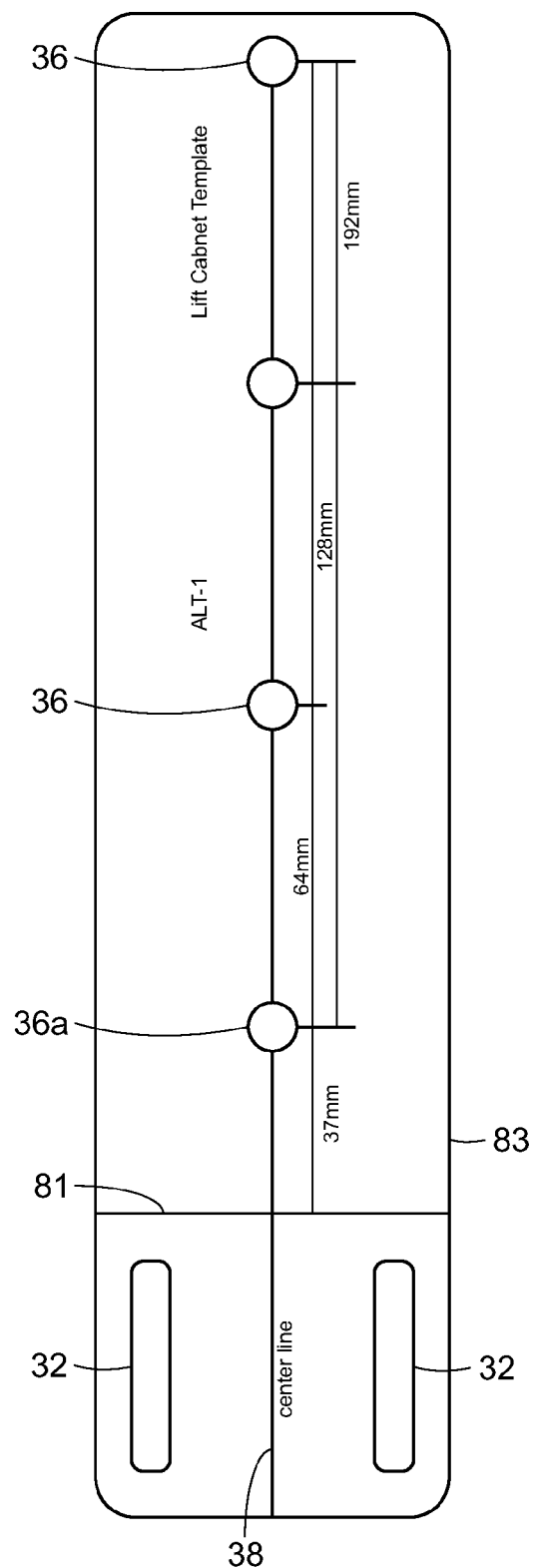
FIG. 8C illustrates an embodiment of a lift cabinet template jig for use with the system of the present invention.

FIGS. 8A-8C illustrate another embodiment of the system 10 comprising a lift door template jig 82 and lift cabinet template jig 83. The lift door and lift cabinet system 10 includes a ruler 12, bolts 16 and tightening knobs 18 that function as described in the other embodiments. The lift door template jig 82 has a pair of adjustment slots 32 as described above. The jig 82 also includes depth measurement markings 34 along the sides such that zero measurement is aligned with the center of a plurality of drill holes 36 disposed along a distal edge of the jig 82. The depth measurement markings 34 establish a distance between the drill holes 36 and the edge of the ruler 12 when the jig 82 is secured to the top of the ruler 12. The jig 82 also includes a center line 38 for proper alignment with the zero starting point 28 on the ruler 12 or another starting point. The plurality of drill holes 36 are spaced thirty-two millimeters apart from adjacent drill holes 36 so as to allow for spacing of either sixteen millimeters from the centerline or forty-eight millimeters from the center line 38 corresponding to standard distances of drill holes in lift doors.

The lift cabinet template jig 83 has a pair of adjustment slots 32 as described above. It also includes a center line 38 and plurality of drill holes 36 disposed along the center line 38. The drill holes 36 have spacing and alignment for standard size cabinet and door hardware. The drill holes 36 are preferably spaced an initial thirty-seven millimeters from a baseline 81 and then in increments of sixty-four millimeters from the first drill hole 36a to a total of one hundred ninety-two millimeters. The system 10 employing lift door template jig 82 and lift cabinet template 83 preferably uses a twelve inch ruler 12 to be compatible with standard cabinet and door sets.

Figure 9A:
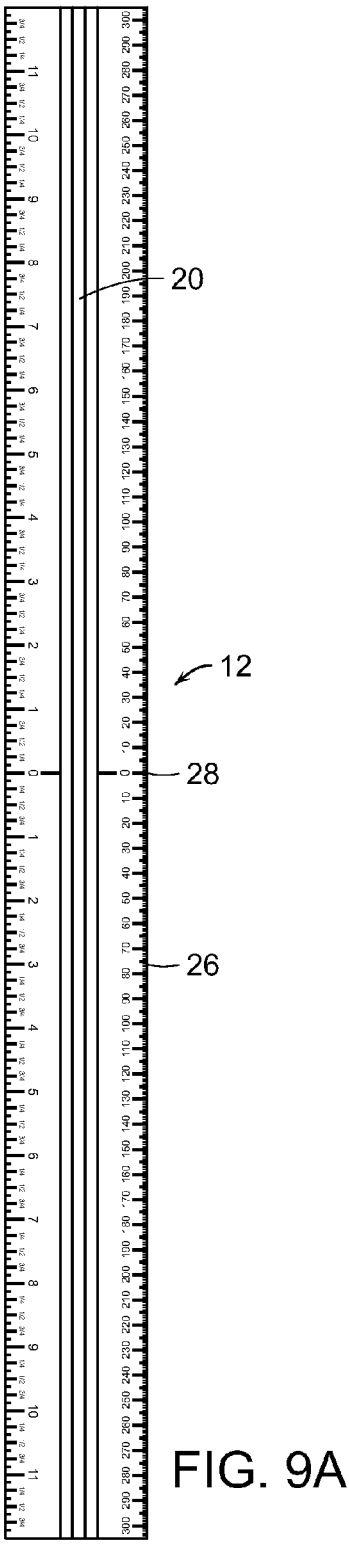
FIG. 9A illustrates an embodiment of a slotted ruler for use with the adjustable shelf drilling jig of FIG. 9B.
Figure 9B:
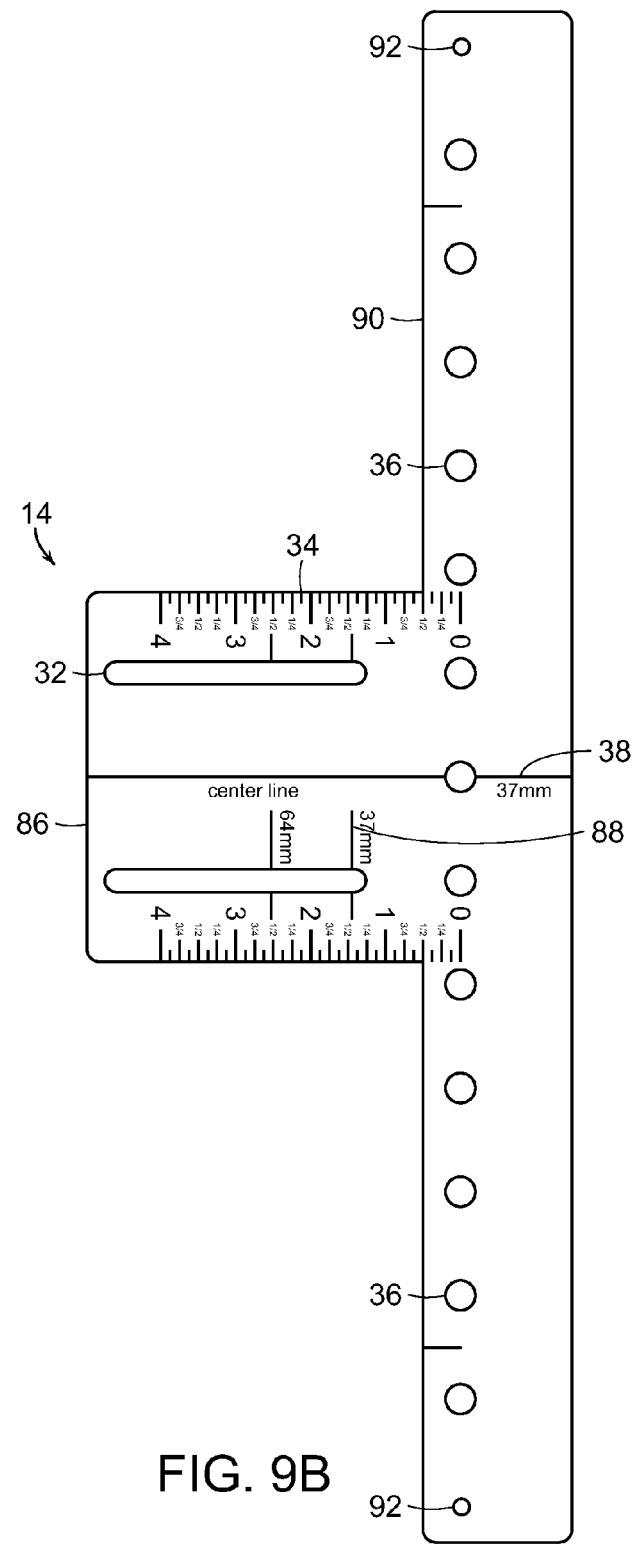
FIG. 9B illustrates an embodiment of an adjustable shelf drilling jig for use with the system of the present invention.
Figure 10A:
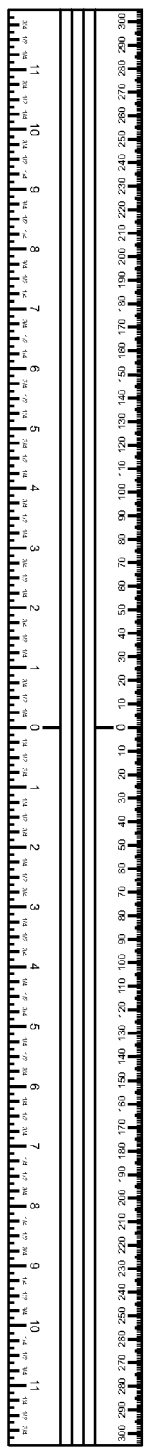
FIG. 10A illustrates an embodiment of a slotted ruler for use with the drawer box to drawer front jig of FIG. 10C.
Figure 10D:
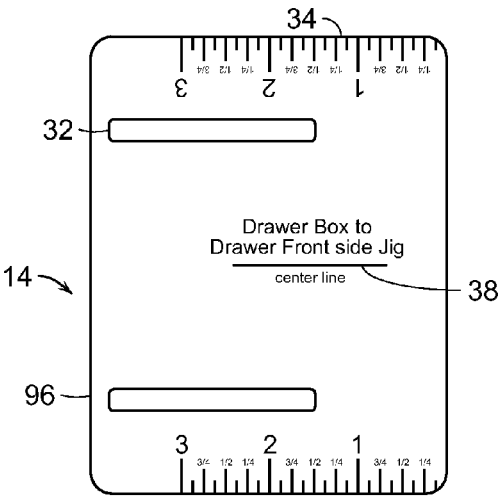
FIG. 10D illustrates an embodiment of a drawer box to drawer front jig for use with the system of the present invention.
Figure 10C:
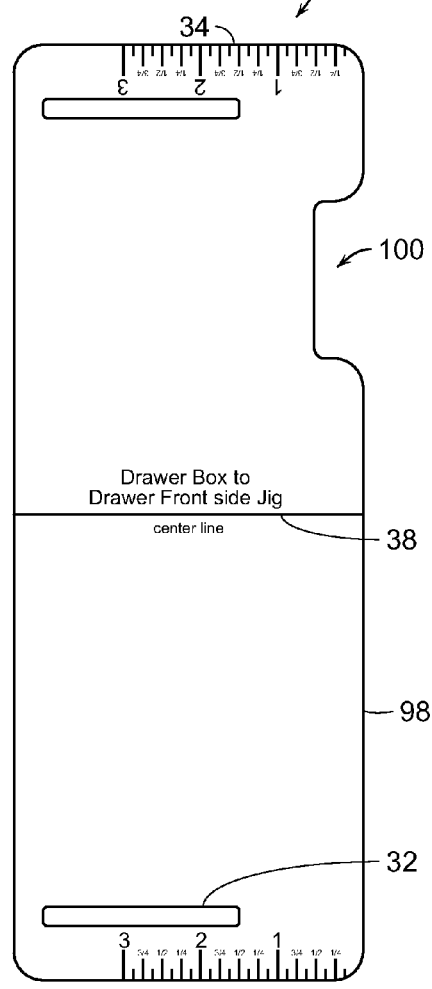
FIG. 10C illustrates an embodiment of a drawer box to drawer front jig for use with the system of the present invention.
Figure 10B:
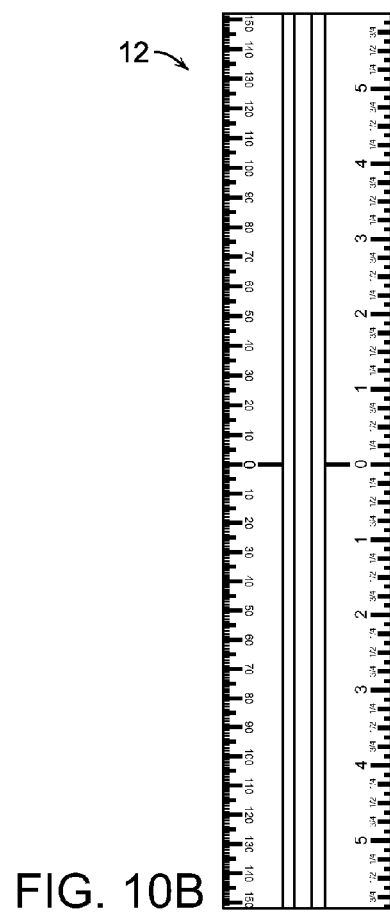
FIG. 10B illustrates an embodiment of a second slotted ruler for use with the drawer box to drawer front jig of FIG. 10D.

FIGS. 9A-9B illustrate another embodiment of the system 10 comprising an adjustable shelf drilling jig 86. As with the other embodiments, this system 10 includes a ruler 12, bolts 16, and tightening knobs 18 that function as described above. The jig 86 includes adjustment slots 32 aligned for use with the bolts 16 and tightening knobs 18. Depth measurement markings 34 are included along the side of the jig 86 near the adjustment slots 32. In addition to the general depth measurement markings 34, the jig 86 includes specific depth markings 88 conforming to standard shelf support depths. These specific markings 88 include thirty-seven millimeters and sixty-four millimeters. Measurement markings 34 and specific markings 88 are also useful for gauging depth where the shelf may include a face plate or other molding on a front surface.

The jig 86 includes extension arms 90 that extend to each side of the jig 86. The extension arms 90 include evenly spaced drill holes 36 matching standard spacing for support dowels or other components that support a shelf. This jig 86 permits the drilling of thirteen holes as configured in the illustration. A greater or lesser number of drill holes 36 may be included depending on the size of the extension arms 90. The jig 86 also includes an alignment hole 92 at each end to properly align the jig 86 with previously drilled holes along the full length of a shelf. One may place a rod or drill bit through the alignment hole 92 and insert it into one of the previously drilled holes so that spacing continuity exists with subsequent holes drilled after the jig 86 is moved.

FIGS. 10A-10D illustrate another embodiment of the system 10 comprising a set of drawer box to drawer front jigs 96, 98. As with the other embodiments, this system 10 includes a ruler 12, bolts 16, and tightening knobs 18 that function as described above. The system 10 preferably includes two rulers 12 sized according to the size of the drawer box and drawer fronts to be manufactured. The jig sets include a side jig 96 and a top jig 98. Each jig 96, 98 includes adjustment slots 32 aligned for use with the bolts 16 and tightening knobs 18 in conjunction with the channel 20. Depth measurement markings 34 are included along the sides of the jigs 96, 98 near the adjustment slots 32. Both jigs 96, 98 also include a center line 38. The top jig 98 includes an offset cutout 100.

Figure 11:
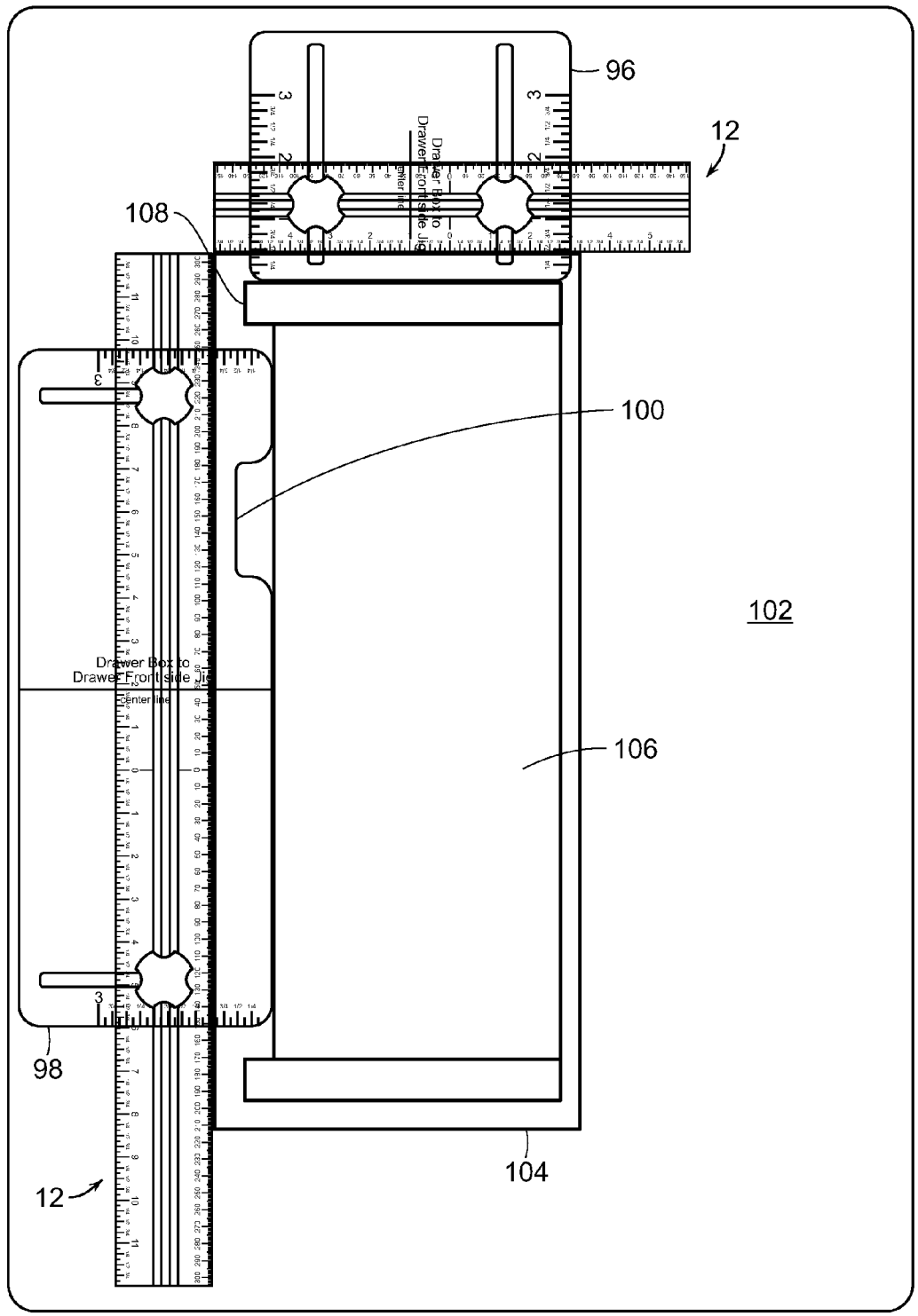
FIG. 11 is an environmental view illustrating use of the inventive system shown in FIGS. 10A-10D.

FIG. 11 illustrates the system 10 of FIGS. 10A-10D in use on a drawer front. A work surface 102 is illustrated. The drawer front 104 is placed face down on the work surface 102. The drawer box 106 is positioned on the back of the drawer front 104 and in this illustration extends upward out of the page. The system 10 uses two rulers 12 placed against the side and top of the drawer front 104. The side jig 96 is attached to the ruler on the side of the drawer front 104 and the adjusting slots 32 are used to set the depth of the side of the drawer box 106 according to the depth measurement markings 34. Similarly, the top jig 98 is attached to the other ruler 12 and the adjustment slots 32 are used in conjunction with the depth measurement markings 34 to set the position of the top or bottom of the drawer box 106 relative to the top or bottom edge of the drawer front 104. The side jig 96 may be moved to the other side of the drawer front 104 to mark the spacing for the other side of the drawer box 106. In certain configurations, the offset cutout 100 may be used to space the top or bottom edge of the drawer box relative to a side panel of the drawer box as shown by circle 108. The rulers 12 may be attached to the work surface 102 such that multiple drawer boxes may be marked using the system 10 without having to reposition the rulers.

Although one may drill all desired holes through the drill holes 36, 37, 58 on each of the jigs described, it is preferred that the drill holes 36, 37, 58 be used for marking the wood to indicate where the drill holes need to be made. One can then drill the holes once the jig is removed. This eliminates the possibility of damaging the jig or drill holes with a drill bit passing through. One may also use spring-loaded drill bits and/or steel hardened bushings configured to rest against the drill holes 36, 37, 58 such that the drill bit is less likely to contact the jig or side of the drill holes.

The ruler 12 may be configured with single or dual channels 20 as desired by the user. These channels 20 are preferably included on the top surface where the measurement markings are located. The channels 20 should not be on the side of the ruler 12 as is found in prior art devices. A side channel does not facilitate the dual adjustment capability of the system 10. A top surface channel 20 permits not only lateral alignment, but depth alignment as well.

The ruler 12 may be made from any material commonly used to make rulers including wood, plastic or metal. Preferably, the ruler 12 is made from a durable and lightweight material such as aluminum with laser scribed markings. The jigs may also be made from any common material such as wood, plastic or metal, but are preferably made from a clear plastic that provides durability but is transparent to see the work piece underneath.

Although several embodiments have been described in detail for purposes of illustration, various modifications may be made without departing from the scope and spirit of the invention.

What is claimed is:

1. A system for positioning and drilling in cabinet, drawer, and shelf hardware components, comprising:

a self-centering ruler having a zero mid-point and graduated measurement markings extending to each side of the zero mid-point toward opposite ends of the self-centering ruler;

a channel disposed along a length of the self-centering ruler, the channel having a generally T-shaped cross-section and configured so as to slidingly receive a head of a securing bolt such that a stem of the securing bolt extends out of an opening in the channel;

a jig template having an adjustment slot configured to receive the stem of the securing bolt extending from the opening of the channel, wherein the jig template comprises a plurality of drill holes having at least one drill hole disposed a pre-set distance from an end of the adjustment slot and a set of measurement depth markings disposed in parallel with the adjustment slot, the measurement depth markings having a zero point, wherein each of the plurality of drill holes is disposed with their centers aligned with the zero point of the measurement depth markings and spread out generally on a zero-line perpendicular to the adjustment slot; and a tightening knob configured to securingly engage the stem of the securing bolt so as to secure the jig template between the tightening knob and the self-centering ruler.

2. The system of claim 1, further comprising two securing bolts, two adjustment slots and two tightening knobs.

3. The system of claim 2, wherein the heads of the two securing bolts are slidingly receivable in the channel such that the stems of the two securing bolts extend out of the opening, wherein each of the two adjustment slots are configured to separately receive one of the stems of the two securing bolts, and wherein the two tightening knobs are configured to securingly engage the stems of the two securing bolts.

4. The system of claim 1, wherein the jig template further comprises a side extension generally along the zero line and including one or more of the plurality of drill holes.

5. The system of claim 1, wherein the jig template comprises a center line generally extending along a center of the jig template and parallel with the adjustment slot.

6. The system of claim 5, wherein the jig template comprises a second plurality of drill holes, each of the second plurality of drill holes disposed with their centers along the center line.

7. The system of claim 5, wherein the jig template further comprises an inset line disposed perpendicular to the center line and a second pre-set distance from one or the plurality of drill holes.

8. The system of claim 1, wherein the set of measurement depth markings is disposed with a zero point aligned with an edge of the jig template and generally extending from the edge in parallel with the adjustment slot.

9. The system of claim 8, wherein the jig template comprises a center line generally extending along a center of the jig template and parallel with the adjustment slot.

10. The system of claim 8, wherein the jig template comprises an offset cutout configured to provide spacing for a top or bottom of a drawer box relative to a side panel of the drawer box.

11. The system of claim 1, further comprising an adjustable stop having an edge guide configured to abut against a side of the self-centering ruler and a bolt hole configured to receive a stem of a stop bolt disposed in the channel and engaged by a stop knob so as to secure the adjustable stop between the stop knob and the self-centering ruler.

12. A system for positioning and drilling in cabinet, drawer, and shelf hardware components, comprising:
- a self-centering ruler having a zero mid-point and graduated measurement markings extending to each side of the zero mid-point toward opposite ends of the self-centering ruler;
- a channel disposed along a length of the self-centering ruler, the channel having a generally T-shaped cross-section and configured so as to slidingly receive a head of a securing bolt such that a stem of the securing bolt extends out of an opening in the channel;
- a jig template having an adjustment slot configured to receive the stem of the securing bolt extending from the opening of the channel, wherein the jig template comprises a set of measurement depth markings disposed in parallel with the adjustment slot, the measurement depth markings having a zero point aligned with an edge of the jig template or a center of a drill hole on the jig template;
- a tightening knob configured to securingly engage the stem of the securing bolt so as to secure the jig template between the tightening knob and the self-centering ruler; and
- wherein the jig template comprises a center line generally extending along a center of the jig template and parallel with the adjustment slot, and wherein the drill hole comprises a cup drill hole and a removable cup insert both centered on the center line, the cup insert having a central hole plug, secondary drill holes spaced around the central hole plug, and notches configured to align the cup insert with the cup drill hole.

* * * * *